(12) United States Patent
Goto et al.

(10) Patent No.: US 8,223,414 B2
(45) Date of Patent: Jul. 17, 2012

(54) QUANTUM COMPUTING METHOD AND QUANTUM COMPUTER

(75) Inventors: Hayato Goto, Kawasaki (JP); Kouichi Ichimura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/239,818

(22) Filed: Sep. 22, 2011

(65) Prior Publication Data

US 2012/0008182 A1 Jan. 12, 2012

Related U.S. Application Data

(62) Division of application No. 12/388,825, filed on Feb. 19, 2009, now Pat. No. 8,049,943.

(30) Foreign Application Priority Data

Feb. 21, 2008 (JP) ................................. 2008-040616

(51) Int. Cl.
*G06E 3/00* (2006.01)
*G06E 1/06* (2006.01)
*H01S 1/00* (2006.01)

(52) U.S. Cl. ......... 359/107; 977/933; 708/191; 250/251

(58) Field of Classification Search .................. 359/107; 977/932–933; 708/191; 250/251
See application file for complete search history.

(56) References Cited

U.S. PATENT DOCUMENTS

| 2006/0043357 A1 | 3/2006 | Ichimura et al. |
| 2006/0169877 A1 | 8/2006 | Goto et al. |

OTHER PUBLICATIONS

Lorenza Viola, et al., "Dynamical suppression of decoherence in two-state quantum systems", Physical Review A, vol. 58, No. 4, Oct. 1998, pp. 2733-2744.
E. Fraval, et al., "Dynamic Decoherence Control of a Solid-State Nuclear-Quadrupole Qubit", Physical Review Letters, vol. 95, Jul. 15, 2005, pp. 030506-1 to 030506-4.
L.M. Duan, et al., "Robust quantum gates on neutral atoms with cavity-assisted photon scattering", Physical Review, vol. 72, 2005, pp. 032333-1 to 032333-4.
Hayato Goto, et al., "Multiqubit controlled unitary gate by adiabatic passage with an optical cavity", Physical Review, vol. 70, 2004, pp. 012305-1 to 012305-8.
K. Bergmann, et al., "Coherent population transfer among quantum states of atoms and Molecules", Reveiws of Modern Physics, vol. 70, No. 3, Jul. 1998, pp. 1003-1025.

*Primary Examiner* — Jade R Chwasz
(74) *Attorney, Agent, or Firm* — Oblon, Spivak, McClelland, Maier & Neustadt, L.L.P.

(57) ABSTRACT

A quantum bit computation method includes operating a two-quantum-bit gate on quantum bits of a first physical system and a second physical system, second energy states of second physical systems except for the first physical system and the second physical system do not change, three energy states being represented by |0>, |1> and |3>, the two energy states being represented by |2> and |4>, energies of |2> and |4> being higher than energies of |0>, |1> and |3>, a transition frequency between |3> and |2> being equal to the resonance frequency, |0> and |1> representing quantum bits, flipping quantum bits of first physical systems after operating the two-quantum-bit gate, executing no operations by a time equal to a time for operating the two-quantum-bit gate, after flipping the quantum bits, and again flipping the quantum bits of the first physical systems after executing no operations.

8 Claims, 5 Drawing Sheets

QUANTUM COMPUTING METHOD AND QUANTUM COMPUTER

CROSS-REFERENCE TO RELATED APPLICATIONS

This application is a division of and claims the benefit of priority under 35 U.S.C. §120 from U.S. Ser. No. 12/388,825 filed Feb. 19, 2009, and claims the benefit of priority under 35 U.S.C. §119 from Japanese Patent Application No. 2008-040616 filed Feb. 21, 2008, the entire contents of each of which are incorporated herein by reference.

BACKGROUND OF THE INVENTION

1. Field of the Invention

The present invention relates to a quantum computer using decoherence control and coupling of an atom with an optical resonator.

2. Description of the Related Art

In quantum computers recently well researched, decoherence that destroys a superposition state has come to be a great problem. It is known that decoherence can be suppressed by bang-bang control (see, for example, L. Viola and S. Lloyd, Phys. Rev. A 58, 2733 (1998)). Further, experiments have been reported which proved that bang-bang control enables the coherence time of a nucleic spin of a rare-earth ion in crystal to be extended from 100 ms to 30 s (see, for example, E. Fraval, M. J. Sellars, and J. J. Longdell, Phys. Rev. Lett. 95, 030506 (2005)).

Thus, bang-bang control is effective to suppress decoherence. However, bang-bang control requires repetition of flipping of a state, and hence it is not obvious whether quantum computation can be executed with decoherence suppressed by bang-bang control. In particular, in quantum computers utilizing an optical resonator, the use of bang-bang control has not yet been reported.

BRIEF SUMMARY OF THE INVENTION

In accordance with an aspect of the invention, there is provided a quantum bit computation method comprising: preparing an optical resonator with a resonance frequency; preparing a plurality of first physical systems contained in the optical resonator and including at least three energy states and two energy states, the three energy states being represented by $|0\rangle$, $|1\rangle$ and $|3\rangle$, the two energy states being represented by $|2\rangle$ and $|4\rangle$, energies of $|2\rangle$ and $|4\rangle$ being higher than energies of $|0\rangle$, $|1\rangle$ and $|3\rangle$, a transition frequency between $|3\rangle$ and $|2\rangle$ being equal to the resonance frequency, $|0\rangle$ and $|1\rangle$ representing quantum bits; operating a two-quantum-bit gate on quantum bits of a first physical system and a second physical system contained in the first physical systems, using the optical resonator and first energy states of the first physical system and the second physical system which are other than $|0\rangle$ and $|1\rangle$, second energy states of second physical systems except for the first physical system and the second physical system do not change; flipping quantum bits of the first physical systems after operating the two-quantum-bit gate; executing no operations by a time equal to a time for operating the two-quantum-bit gate, after flipping the quantum bits; and again flipping the quantum bits of the first physical systems after executing no operations.

In accordance with another aspect of the invention, there is provided a quantum bit computation method comprising: preparing an optical resonator with a resonance frequency; preparing a plurality of first physical systems contained in the optical resonator and including four energy states and two energy states, the four energy states being represented by $|0\rangle$, $|1\rangle$, $|3\rangle$ and $|5\rangle$, the two energy states being represented by $|2\rangle$ and $|4\rangle$, energies of $|2\rangle$ and $|4\rangle$ being higher than energies of $|0\rangle$, $|1\rangle$, $|3\rangle$ and $|5\rangle$, a transition frequency between $|3\rangle$ and $|2\rangle$ being equal to the resonance frequency, $|0\rangle$ and $|1\rangle$ representing quantum bits; shifting $|0\rangle$ of each of a first physical system and a second physical system, included in the first physical systems, to $|3\rangle$ by emitting thereto light pulses resonating with $|0\rangle$-$|4\rangle$ transitions of the first physical system and the second physical system and $|3\rangle$-$|4\rangle$ transitions of the first physical system and the second physical system; shifting $|1\rangle$ of the first physical system and the second physical system to $|5\rangle$ by emitting thereto light pulses resonating with $|1\rangle$-$|4\rangle$ transitions of the first physical system and the second physical system and $|5\rangle$-$|4\rangle$ transitions of the first physical system and the second physical system; emitting, to the optical resonator, a single-photon pulse with the resonance frequency; flipping quantum bits of second physical systems except for the first physical system and the second physical system, the second physical systems being included in the first physical systems; flipping $|3\rangle$ and $|5\rangle$ of each of the first physical system and the second physical system; executing no operations by a time equal to a time for emitting the single-photon pulse to the optical resonator; returning $|3\rangle$ of each of the first physical system and the second physical system to $|0\rangle$ by emitting thereto light pulses resonating with the $|0\rangle$-$|4\rangle$ transitions and the $|3\rangle$-$|4\rangle$ transitions; returning $|5\rangle$ of the first physical system and the second physical system to $|1\rangle$ by light pulses resonating with the $|1\rangle$-$|4\rangle$ transitions and the $|5\rangle$-$|4\rangle$ transitions; and flipping quantum bits of the first physical systems.

DETAILED DESCRIPTION OF THE INVENTION

A quantum computing method and quantum computer according to an embodiment of the invention will be described in detail with reference to the accompanying drawing. In the embodiment, like reference numbers denote like elements, and no duplicate descriptions will be given.

Firstly, a description will be given of the conditions for suppressing decoherence (phase relaxation) using bang-bang control (see L. Viola and S. Lloyd, Phys. Rev. A 58, 2733 (1998)). To suppress decoherence of a quantum system having two quantum states |0> and |1> (quantum bits), it is sufficient if the state of the quantum system is repeatedly flipped between |0> and |1> in a certain time interval T. In this case, a change in state that occurs during a period from t to t+T is offset by a change in state that occurs during a period from t+T to t+2T, thereby suppressing phase relaxation (it is supposed that flipping is carried out at times t+T and t+2T). This is bang-bang control. To make the offset successful, the following conditions 1 and 2 must be satisfied:

1. The time interval T is sufficiently short; and
2. The existing probability of each of the states |0> and |1> does not change between two flip operations.

Concerning the condition 1, it is known that T should be less than 5 ms in experiments carried out using a nucleic spin of a rare-earth ion (E. Fraval, M. J. Sellars, and J. J. Longdell, Phys. Rev. Lett. 95, 030506 (2005)). To execute quantum computation under bang-bang control, attention must be paid to the above condition 2.

In the quantum computer for operating a two-quantum-bit gate using an optical resonator, according to the embodiment, two methods for suppressing decoherence that occurs during operation of the two-quantum-bit gate, using bang-bang control will be proposed. In a first method, decoherence cannot be suppressed between two quantum bits on which the two-quantum-bit gate is operated (decoherence between the other quantum bits can be suppressed), although its procedure is simple. In a second method, bang-bang control is effective on all quantum bits, although its procedure is complex.

In the quantum computer for operating a two-quantum-bit gate using an optical resonator, according to the embodiment, decoherence that occurs during the operation of the two-quantum-bit gate can be suppressed by bang-bang control.

Figure 1:
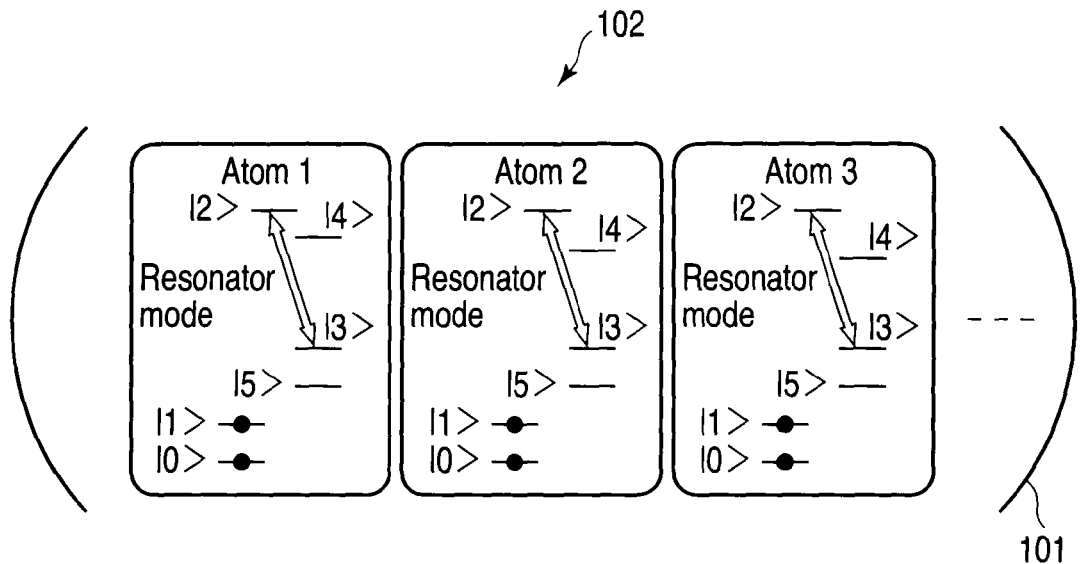
FIG. 1 is a view illustrating the energy levels of atoms used for a quantum computer according to an embodiment.
Figure 2:
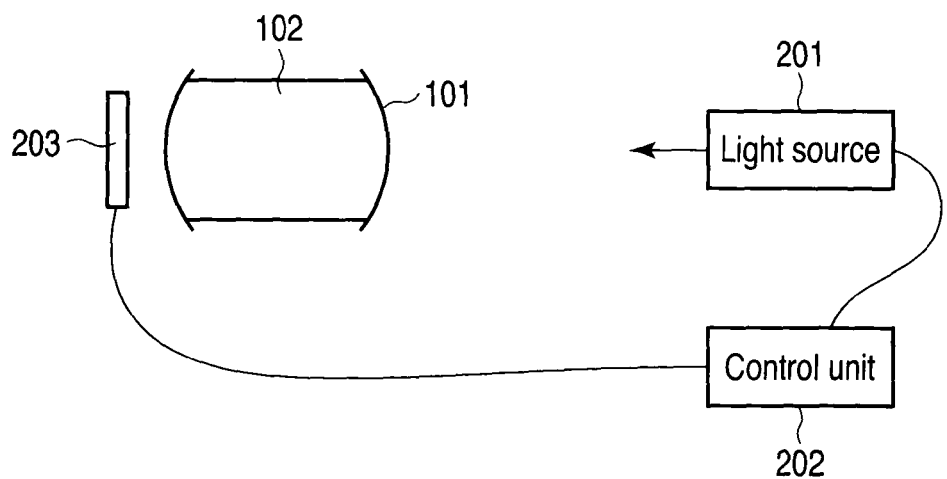
FIG. 2 is a block diagram illustrating the quantum computer of the embodiment.

Referring to FIGS. 1 and 2, a description will be given of the quantum computing method and quantum computer according to the embodiment, which use the first and second methods.

As shown in FIG. 2, the quantum computer comprises a light source 201, a control unit 202, an optical resonator 101, physical systems 102, and a magnetic field generator 203.

The light source 201 is a frequency stabilized light source, and generates a single-photon pulse. The light source 201 is used to perform gate operations on quantum bits to operate the states of the physical systems 102 contained in crystal 892 (see FIG. 8).

The control unit 202 controls the on/off and frequency of the light source 201, and the on/off of the magnetic field generator 203.

The optical resonator 101 has a resonance frequency.

The physical systems 102 are contained in the optical resonator 101 as shown in FIG. 1.

The magnetic field generator 203 is formed of a coil, and generates a high-frequency oscillation magnetic field to be applied to the physical systems 102. The magnetic field generator 203 generates a π pulse that resonates with a transition between particular two states of each physical system, thereby flipping the two states.

First Method)

A plurality of atoms (or ions) having energy levels as shown in FIG. 1 are arranged in the optical resonator 101. In this case, there are three or more ground states (stable lower levels) (in the case of FIG. 1, there are four states—|0>, |1>, |3> and |5>). Two of the four states, i.e., |0> and |1> in FIG. 1, are used as quantum bits. Suppose that there are two excited states (upper levels) used, and a transition between one (|2> in FIG. 1) of them and one (|3> in FIG. 1) of the ground states other than the two states used as quantum bits is strongly coupled with the resonator mode. Selection of atoms can be realized using differences in their positions, or by making the transition frequency between an excited state (|4> in FIG. 1), which does not couple with the resonator mode, and each ground state, significantly vary between the atoms.

Figure 3:
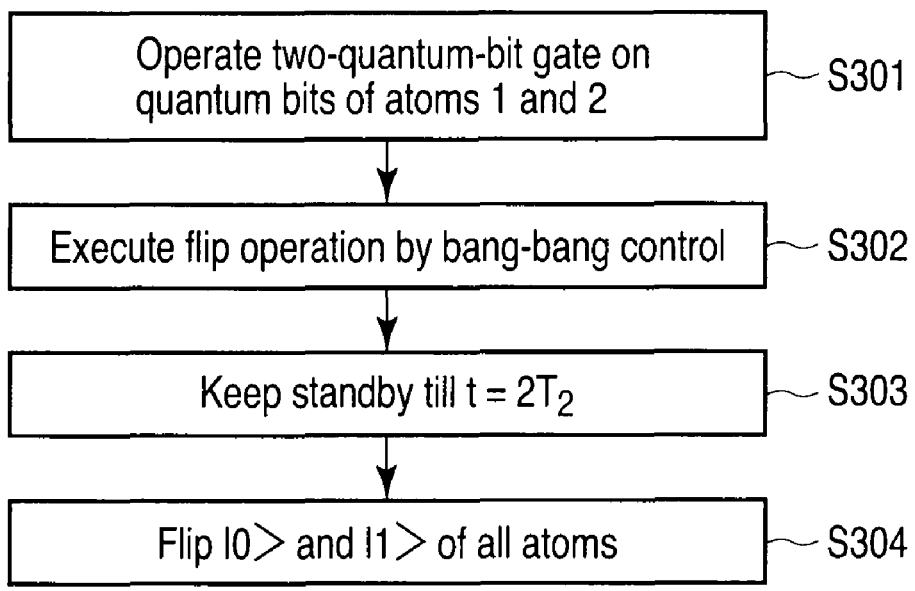
FIG. 3 is a flowchart illustrating an operation example performed when a first method is employed in the quantum computer of FIG. 2.

Referring now to FIG. 3, a description will be given of an example where the quantum computer of the embodiment employs the first method to operate a two-quantum-bit gate on the quantum bits of atoms 1 and 2 shown in FIG. 1.

At time t=0, suppose that all atoms are in a certain superposition state of |0> and |1>. Firstly, a two-quantum-bit gate is operated on atoms 1 and 2 using an existing method (step S301). At this time, the states of the atoms other than atoms 1 and 2 are kept unchanged. The methods disclosed in, for example, the following two treatises are usable existing methods: L.-M. Duan, B, Wang and H. J. Kimble, Phys. Rev. A 70, 72, 032333 (2005); Hayato Goto and Kouichi Ichimura, Phys. Rev. A 70, 012305 (2004). The disclosed methods will be described later with reference to FIGS. 4 and 5. Supposing that the time required for the operation of the two-quantum-bit gate is $T_2$, the two-quantum-bit gate operation is finished at a time point of $T_2$.

Subsequently, a flip operation is executed using bang-bang control (step S302). Specifically, the control unit 202 controls the magnetic field generator 203 to generate an oscillating magnetic field (π pulse) and flip the states |0> and |1> of all atoms, using the π pulse. Suppose that the time required for this flip operation can be ignored. The "π pulse" is a pulse of a frequency that resonates with a transition between two states and flips the two states. Suppose also that the flipped two states are caused by a spin of each atom, and the pulse to be applied is an oscillating magnetic field (when the transition between the two states include a dipole transition, an electromagnetic wave can be used as the π pulse).

Thereafter, the control unit 202 stops the generation of the oscillating magnetic field by the magnetic field generator 203 and the emission of light from the light source 201 until $t=2T_2$ (step S303).

Lastly, the control unit 202 controls the magnetic field generator 203 to re-generate an oscillating magnetic field (π pulse) to again flip the states |0> and |1> of all atoms, using the π pulse (step S304, the $2^{nd}$ flip operation by bang-bang control).

As described above, decoherence having occurred during the time $2T_2$ can be suppressed by bang-bang control. However, it should be noted that since various operations necessary for the operation of a two-quantum-bit gate are performed on atoms 1 and 2, the above-mentioned condition 2 for bang-bang control is not satisfied, and hence atoms 1 and 2 are adversely affected by the decoherence that occurs during the operations, but that the influence of decoherence can be suppressed as a whole, compared to the case where no bang-bang control is executed.

Figure 4:
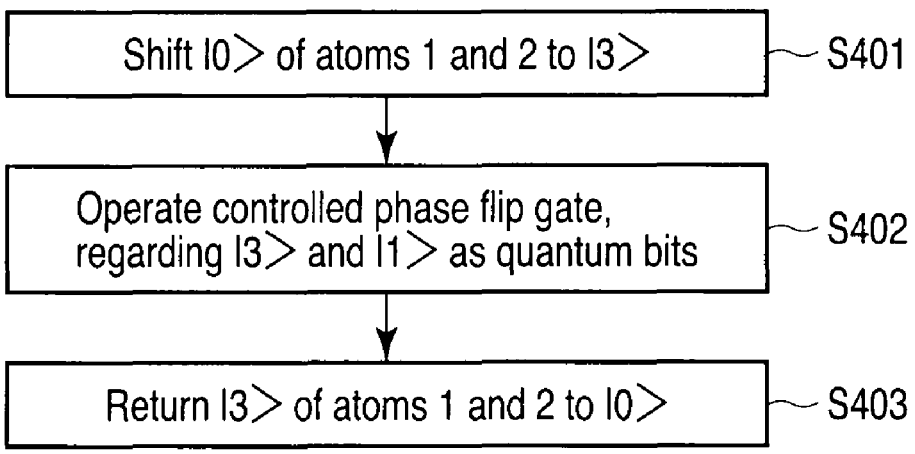
FIG. 4 is a flowchart illustrating the procedure of Duan et al. employed when a two-quantum-bit gate is operated at step S301 of FIG. 3.

A description will now be given of a specific procedure for operating a two-quantum-bit gate at step S301. Referring first to FIG. 4, the case of using the method of Duan et al. will be described, and then to FIG. 5, the case of using the method of Goto et al. will be described.

Specifically, the procedure of operating a controlled phase-flip gate on atoms 1 and 2 using the method of Duan et al. will be described with reference to FIG. 4.

The controlled phase-flip gate is a two-quantum-bit gate defined by the following expression:

$$\alpha_{00}|0\rangle|0\rangle + \alpha_{01}|0\rangle|1\rangle + \alpha_{10}|1\rangle|0\rangle + \alpha_{11}|1\rangle|1\rangle \rightarrow \quad (1)$$

$$\alpha_{00}|0\rangle|0\rangle + \alpha_{01}|0\rangle|1\rangle + \alpha_{10}|1\rangle|0\rangle - \alpha_{11}|1\rangle|1\rangle$$

The thus-defined two-quantum-bit gate is a basic gate that can provide an arbitrary quantum gate when it is simply combined with a single qubit gate.

Firstly, the state |0> of atoms 1 and 2 is shifted to |3> (step S401). To realize this shift, the control unit 202 controls the light source 201 to perform Lambda-type Stimulated Raman Adiabatic Passage (STIRAP; see K. Bergmann, H. Theuer and B. W. Shore, Rev. Mod. Phys. 70, 1003 (1998)) using an excited state (|4> in FIG. 1) that is not coupled with the resonator mode.

Subsequently, the light source 201 emits a single-photon pulse that resonates with the resonator, thereby operating a controlled phase-flip gate in which |3> and |1> are regarded as quantum bits (see L.-M. Duan, B, Wang and H. J. Kimble, Phys. Rev. A 70, 72, 032333 (2005); step S402). When using the method of Duan et al., the optical resonator 101 is a one-sided resonator including a total reflection mirror and a partial transmission mirror 891, and the light source 201 emits, from the partial transmission mirror 891 side, a single-photon pulse of the same frequency as the resonance frequency of the resonator.

Thereafter, the control unit 202 controls the light source 201 to return the state |3> of atoms 1 and 2 to |0> again through Lambda-type STIRAP (step S403).

The above process is a controlled phase-flip gate operated on the quantum bits of atoms 1 and 2. During this process, the states of the other atoms do not change.

Figure 5:
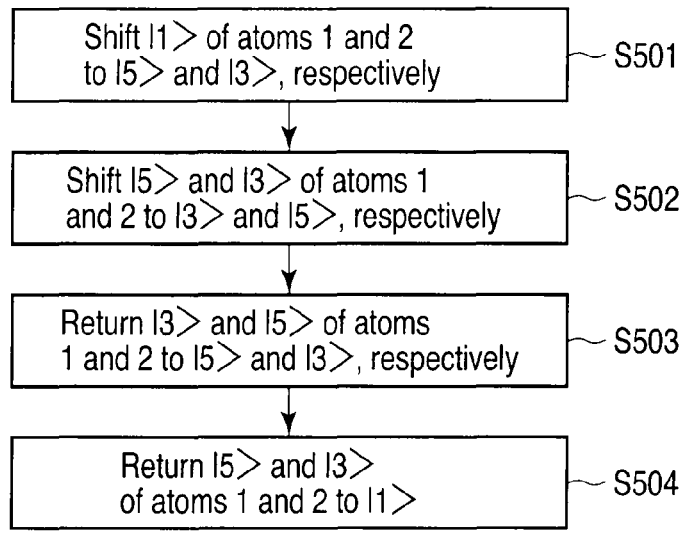
FIG. 5 is a flowchart illustrating the procedure of Goto et al. employed when a two-quantum-bit gate is operated at step S301 of FIG. 3.

Referring then to FIG. 5, a description will be given of the procedure of operating a controlled phase-shift gate on atoms 1 and 2, using the method of Goto et al. The controlled phase-shift gate is a two-quantum-bit gate defined by the following expression:

$$\alpha_{00}|0\rangle|0\rangle + \alpha_{01}|0\rangle|1\rangle + \alpha_{10}|1\rangle|0\rangle + \alpha_{11}|1\rangle|1\rangle \rightarrow \quad (2)$$

$$\alpha_{00}|0\rangle|0\rangle + \alpha_{01}|0\rangle|1\rangle + \alpha_{10}|1\rangle|0\rangle + e^{i\theta}\alpha_{11}|1\rangle|1\rangle$$

The thus-defined two-quantum-bit gate is a basic two-quantum-bit gate that includes the above-mentioned controlled phase-flip gate (when $\theta=\pi$, the controlled phase-flip gate is operated).

Firstly, the control unit 202 controls the light source 201 to shift the states |1> of atoms 1 and 2 to |5> and |3>, respectively, through Lambda-type STIRAP executed using an excited state |4> (step S501).

Subsequently, the light source 201 emits light pulses that resonate with |5>-|2> transitions of atoms 1 and 2, thereby shifting the states |5> and |3> of atoms 1 and 2 to |3> and |5>, respectively, via adiabatic passage executed using the resonator (see Hayato Goto and Kouichi Ichimura, Phys. Rev. A 70, 012305 (2004), step S502).

After that, the light source 201 emits light pulses that resonate with |5>-|2> transitions and have their phases shifted by θ from the pulses used at step S502, thereby returning the states |3> and |5> of atoms 1 and 2 to |5> and |3>, respectively, via adiabatic passage executed using the resonator (step S503).

Thereafter, the control unit 202 controls the light source 201 to return the states |5> and |3> of atoms 1 and 2 to |1> through Lambda-type STIRAP executed using the excited state |4> (step S504).

The above-described process is a controlled phase-shift gate for shifting, by θ, the phases of the quantum bits of atoms 1 and 2. During the process, the states of the other atoms do not change.

Second Method

The quantum computer shown in FIGS. 1 and 2 executes a second method as in the case of the first method.

A plurality of atoms (or ions) having such energy levels as shown in FIG. 1 are arranged in the optical resonator 101. There are four ground states (stable lower levels), i.e., |0>, |1>, |3> and |5>, and two of them, i.e., |0> and |1>, are used as quantum bits. Suppose that there are two excited states (upper levels) used, and a transition between one (|2> in FIG. 1) of them and one (|3> in FIG. 1) of the ground states other than the two states used as quantum bits is strongly coupled with the resonator mode. Selection of atoms can be realized using differences in their positions, or by making the transition frequency between an excited state (|4> in FIG. 1), which does not couple with the resonator mode, and each ground state, significantly vary between the atoms.

In the second method, a controlled phase-flip gate is operated based on the method of Duan et al. Referring now to FIG. 5, a description will be given of an operation example of the quantum computer of the embodiment based on the second method, considering a case where the controlled phase-flip gate is operated on the quantum bits of atoms 1 and 2.

At time t=0, suppose that all atoms are in a certain superposition state of |0> and |1>. Firstly, the control unit 202 controls the light source 201 to shift the states |0> and |1> of atoms 1 and 2 to |3> and |5>, respectively, through Lambda-type STIRAP executed using an excited state |4> (step S601). Supposing that time $T_1$ is required for one shift, the above shift process finishes at $t=4T_1$.

Subsequently, the light source 201 emits a single-photon pulse that resonates with the resonator, thereby operating a controlled phase-flip gate in which |3> and |5> are regarded as quantum bits (step S602). Supposing that the time required for the operation of the controlled phase-flip gate is $T_2$, the controlled phase-flip gate operation is finished at a time point of $4T_1+T_2$.

In the second method, flip operations based on bang-bang control are performed at this stage. Firstly, a flip operation is performed on the quantum bits of the atoms other than atoms 1 and 2 (step S603). Namely, the control unit 202 controls the magnetic field generator 203 to generate an oscillating magnetic field (π pulse) and flip the states |0> and |1> of the atoms other than atoms 1 and 2, using the π pulse.

After that, the control unit 202 controls the magnetic field generator 203 to generate an oscillating magnetic field (π pulse) and flip the states |3> and |5> of atoms 1 and 2, using the π pulse (step S604). Suppose that the π pulse for flipping |3> and |5> is sufficiently off-resonant with a |0>-|1> transition, and hence does not influence the atoms other than atoms 1 and 2, and also that the time required for the above-mentioned flip operations using the π pulse can be ignored.

Subsequently, the control unit 202 controls the magnetic field generator 203 to stop the generation of the magnetic field, controls the light source 201 to stop the emission, and keeps them in a standby state by time $T_2$ (step S605).

Thereafter, the control unit 202 controls the light source 201 to return the states |3> and |5> of atoms 1 and 2 to |0> and |1>, respectively, through Lambda-type STIRAP executed using the excited state |4> (step S606). The shift process is finished at a time point of $2(4T_1+T_2)$.

Lastly, the control unit 202 controls the magnetic field generator 203 to generate an oscillating magnetic field ($\pi$ pulse) and flip the states |0> and |1> of all atoms using the $\pi$ pulse (step S304, the $2^{nd}$ flip operation by bang-bang control). Thus, decoherence that has occurred during a time period of $2(4T_1+T_2)$ can be suppressed by bang-bang control. However, it should be noted that although decoherence of atoms 1 and 2 that has occurred during $T_2$ before the $1^{st}$ flip operation and during $T_2$ after the same, i.e., during $2T_2$ in total, is suppressed, decoherence that has occurred during the other time $8T_1$ is not suppressed (because atoms 1 and 2 assume the states |0> and |1> during $8T_1$, instead of |3> or |5>). In the second method, during the above-mentioned time period of $2T_2$, the two conditions for bang-bang control are satisfied even for the two atoms on which a two-quantum-bit gate is operated. This differs from the first method. If $T_1$ is sufficiently shorter than $T_2$, the time period of $2T_2$ in which decoherence of atoms 1 and 2 can be suppressed is substantially equal to the total time period of $2(4T_1+T_2)$, and hence bang-bang control is effective even for the two atoms, and the influence of decoherence can be significantly reduced, compared to the case where bang-bang control is not executed.

Figure 7:
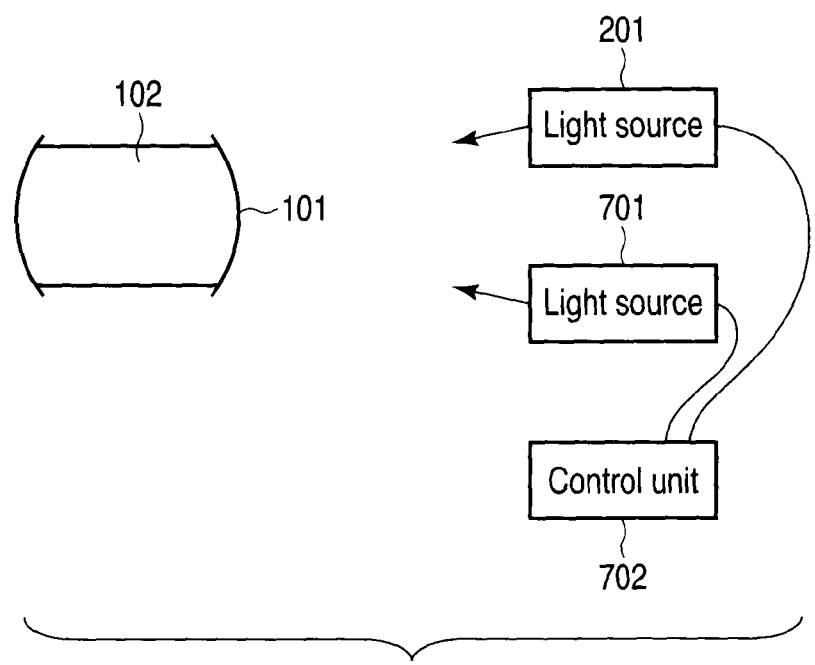
FIG. 7 is a block diagram illustrating a quantum computer according to a modification of the embodiment.

Referring then to FIG. 7, a modification of the quantum computer of the embodiment will be described.

The quantum computer of FIG. 7 differs from the quantum computer of FIG. 2 in the method of flipping the states of quantum bits. The former computer is obtained by adding another light source 701 to the latter computer.

To flip |3> and |5>, the light source 701 emits two light pulses to atoms, instead of the $\pi$ pulse, under the control of the control unit. The two light pulses are two-photon resonant with a |3>-|5> transition, but are little excited by |2> although they have frequencies close to a |3>-|2> transition frequency and also close to a |5>-|2> transition frequency. Unlike the $\pi$ pulse as an oscillating magnetic field, the light pulses enable the states |3> and |5> of atoms 1 and 2 to be flipped without adversely affecting the atoms other than atoms 1 and 2, even when the difference between a |3>-|5> transition frequency and a |0>-|1> transition frequency is small.

In the above-described embodiment and its modification, decoherence of all quantum bits other than two quantum bits, on which a two-quantum-bit gate is operated, can be suppressed by bang-bang control in which a controlled phase-shift gate is operated on atoms each having four ground states and two excited states, or a controlled phase-flip gate is operated on atoms each having three ground states and two excited states. Further, decoherence of all quantum bits including two quantum bits, on which a two-quantum-bit gate is operated, can be suppressed by bang-bang control in which a controlled phase-flip gate is operated on atoms each having four ground states and two excited states.

Method examples employed in the above-described quantum computer will now be described.

Figure 8:
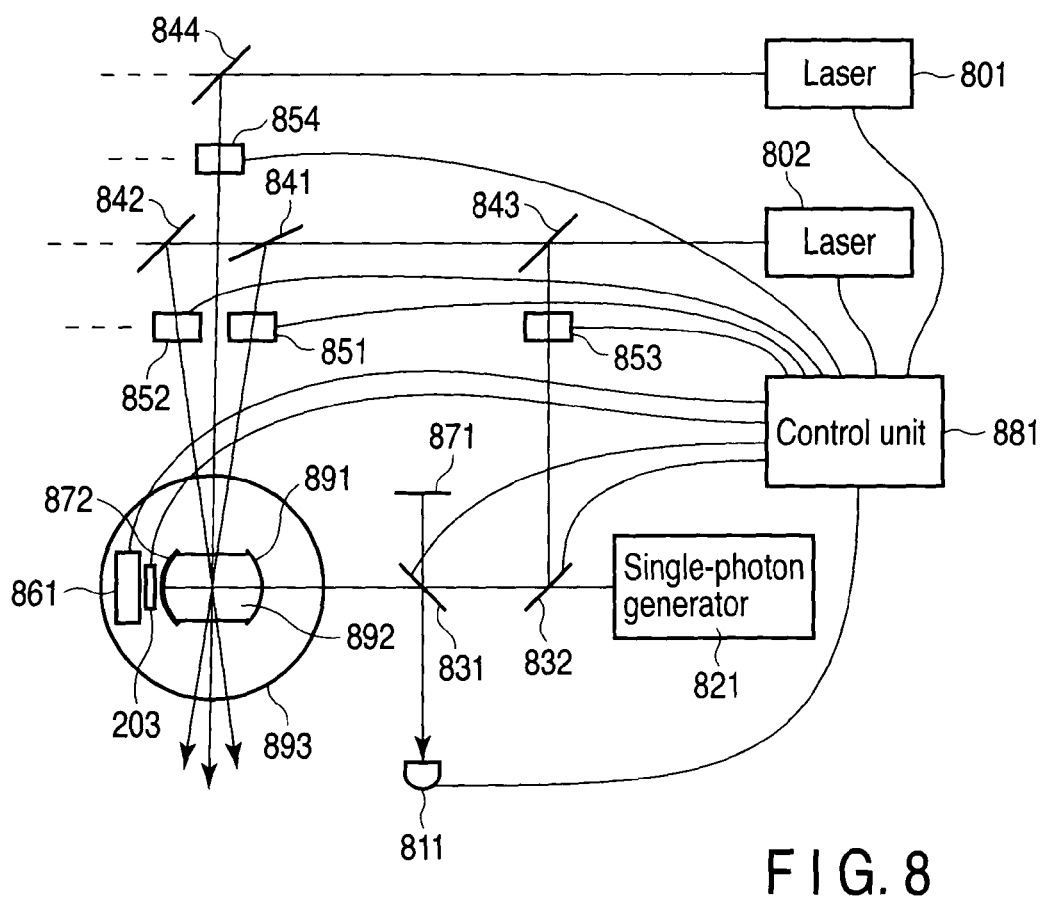
FIG. 8 is a block diagram illustrating the quantum computer of the embodiment.

Referring first to FIG. 8, the specific configuration of the quantum computer will be described.

The quantum computer comprises dye lasers 801 and 802, a photon detector 811, a single-photon generator 821, transmittance variable mirrors 831 and 832, beam splitters 841 to 844, acousto-optic modulators 851 to 854, magnetic field generators 203 and 861, total reflection mirrors 871 and 872, a control unit 881, a partial transmission mirror 891, crystal 892, and a cryostat 893.

The beam splitters 841 to 844 split light into transmitted light and reflected light, or guide both transmitted light and reflected light to post stages.

The acousto-optic modulators 851 to 854 change the frequency of input light to their respective set frequencies, and changes the intensity of the input light to their respective set intensities, based on control signals output from the control unit 881, and output light beams of changed frequencies and intensities. The acousto-optic modulators 851 and 852 adjust detuning.

Figure 10:
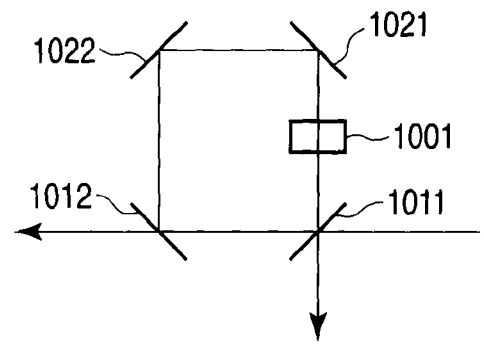
FIG. 10 is a schematic view illustrating a ring resonator that realizes a transmittance variable mirror shown in FIG. 8.

The transmittance variable mirrors 831 and 832 are special mirrors that can be switched between high reflection and high transmittance, and their transmittances are controlled by the control unit 881. The transmittance variable mirrors 831 and 832 can be realized by, for example, the ring-type resonator shown in FIG. 10. The transmittance of each of the transmittance variable mirrors 831 and 832 can be adjusted by adjusting the phase of a phase adjuster 1001. In FIG. 10, reference numbers 1021 and 1022 denote total reflection mirrors, and reference numbers 1011 and 1012 denote partial transmission mirrors. Suppose that the partial transmission mirrors 1011 and 1012 have the same transmittance.

The dye lasers 801 and 802 are used as light sources and have their frequencies stabilized. The light output from the dye laser 802 is split by the beam splitters 841, 842 and 843, and has its frequency appropriately set by the acousto-optic modulators 851, 852 and 853.

The crystal 892 is, for example, $Pr^{3+}:Y_2SiO_5$ with its surface mirror processed, and is a component of the optical resonator. Although the crystal 892 is $Pr^{3+}:Y_2SiO_5$ crystal in the embodiment, the embodiment is not limited to this. If the same effect as that of crystal is obtained, a material other than crystal may be employed. The total reflection mirror 872 and partial transmission mirror 891 are other components of the optical resonator. Further, $Pr^{3+}$ ions doped in crystal $Y_2SiO_5$ may be used as physical systems.

Figure 11:
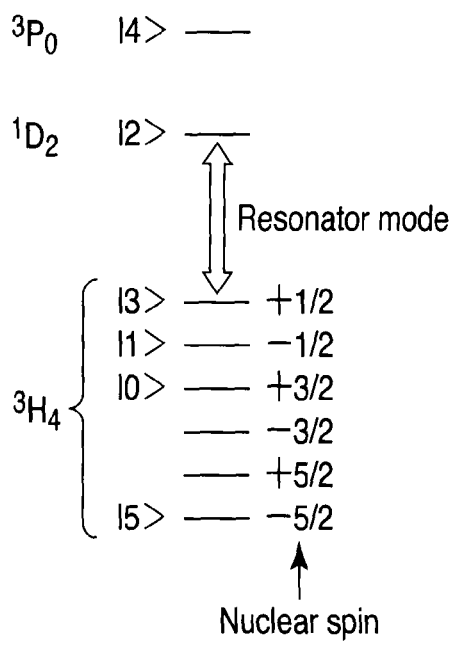
FIG. 11 is a view illustrating energy levels employed where the procedure of Goto et al. is utilized in the first method, and where the second method is used.
Figure 12:
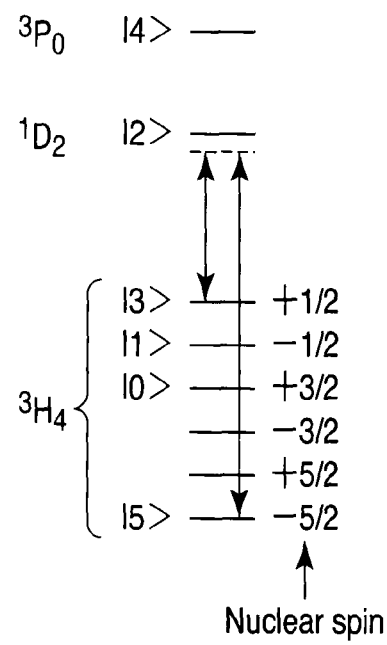
FIG. 12 is a view useful in explaining frequency setting for pulses that are two-photon resonant and can be used in place of a π pulse.

The magnetic field generator 861 generates a magnetic field applied to the crystal 892, thereby splitting the degenerated energy state of the crystal. In the embodiment, the magnetic field generator 861 always generates a magnetic field of a preset intensity. The magnetic field generator 861 beforehand applies a magnetic field to the crystal 892 to cause Zeeman splitting. Suppose here that |0>, |1>, |3> and |5> shown in FIGS. 11 and 12 are assigned to four hyperfine levels included in the ground states $^3H_4$ of each $Pr^{3+}$ ion, and |2> shown in FIGS. 11 and 12 is assigned to a single hyperfine level included in the excited states $^1D_2$ of each $Pr^{3+}$ ion. Further, another excited state |4> is assigned to one hyperfine level included in excited states $^3P_0$ of each $Pr^{3+}$ ion. An optical resonator is formed by mirror processing the surface of crystal. Those $Pr^{3+}$ ions, whose |3>-|2> transitions resonate with the resonator mode, are used, and the states |0> and |1> of each ion are used as quantum bits.

The photon detector 811 detects whether a photon is generated. It detects a photon, output from the optical resonator, at high accuracy and high efficiency.

The single-photon generator 821 generates a single photon that resonates with the optical resonator.

First Example

Referring to FIG. 8, a description will be given of a first example of a first method in which the method of Duan et al. is used.

Figure 9:
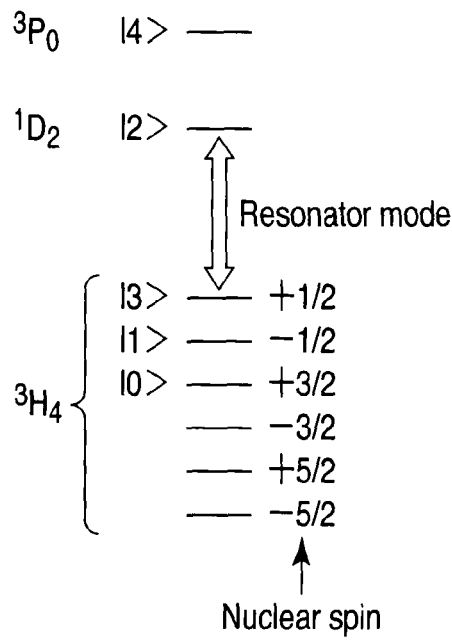
FIG. 9 is a view illustrating energy levels employed where the procedure of Dual et al. is utilized in the first method of the energy levels of ions.

In this example, $Pr^{3+}$ ions doped in the $Y_2SiO_5$ crystal 892 are used as the above-mentioned physical systems (atoms or ions). To extend the coherence time, a magnetic field of an appropriate direction and magnitude is applied to the sample (see E. Fraval, M. J. Sellars, and J. J. Longdell, Phys. Rev. Lett. 95, 030506 (2005)). When the magnetic field generator 861 applies a magnetic field to the $Pr^{3+}$ ions in $Pr^{3+}$:$Y_2SiO_5$, the ground state of each ion is split into six hyperfine levels as shown in FIG. 9. The above-mentioned energy states $|0\rangle$, $|1\rangle$ and $|3\rangle$ are assigned to three of the six hyperfine levels. Further, the above-mentioned energy state $|2\rangle$ is assigned to one of the excited states $^1D_2$ of each ion, and the above-mentioned energy state $|4\rangle$ is assigned to one of the excited states $^3P_0$ of each ion. An optical resonator is formed by mirror processing the surface of the crystal 892. The total reflection mirror 872 and partial transmission mirror 891 are used as the opposite mirrors of the optical resonator, thereby providing a single-sided resonator. Those $Pr^{3+}$ ions, whose $|2\rangle$-$|3\rangle$ transitions resonate with the resonator mode, are used, and the energy states $|0\rangle$ and $|1\rangle$ of each ion are used as quantum bits. The entire crystal 892 is placed in the cryostat 893, and is kept at 4K, i.e., the temperature of liquid helium.

The dye lasers 801 and 802 having their frequencies stabilized are used as light sources, and the laser beams emitted therefrom are slit into beams by the beam splitters 841 to 844. The split beams are subjected to the acousto-optic modulators 851 to 854, where the beams have their frequencies and intensities appropriately adjusted. The dye laser 802 is used to prepare beams that resonate with transitions between $|0\rangle$-$|2\rangle$, between $|1\rangle$-$|2\rangle$ and between $|3\rangle$-$|2\rangle$, and the dye laser 802 is used to prepare beams that resonate with transitions between $|0\rangle$-$|4\rangle$, between $|1\rangle$-$|4\rangle$ and between $|3\rangle$-$|4\rangle$.

An initialization process will be firstly described.

At first, the control unit 881 sets the transmittance variable mirror 831 to a transmittance of 100%, and the transmittance variable mirror 832 to a reflectance of 100%, and causes light beams resonating with the resonator to be applied to the resonator from outside for a certain period. Subsequently, the control unit 881 causes light beams, which resonate with all ground states and excited state $|2\rangle$ of ions whose $|2\rangle$-$|3\rangle$ transitions resonate with the resonator mode, to be applied for a certain period through a side of the resonator to the position of the resonator mode, i.e., the center of the crystal, and then causes only the light beam resonating with a $|0\rangle$-$|2\rangle$ transition to stop and the other light beams to be again applied for a further certain period. Thus, the ions, which are positioned at the resonator mode position, i.e., at the center of the crystal 892, and whose $|2\rangle$-$|3\rangle$ transitions resonate with the resonator, are initialized to $|0\rangle$. The states $|0\rangle$ and $|1\rangle$ of these ions are used as quantum bits. Since the excited state $^3P_0$ is inhomogeneously spread, transition frequencies between all ground states and the excited state $|4\rangle$ significantly differ between different ions. Further, transition frequencies between all ground states and the excited state $|4\rangle$ significantly differ from those between all ground states and the excited state $|2\rangle$. Accordingly, the light beams that resonate with transitions between all ground states of a certain ion and the excited state $|4\rangle$ of the same are sufficiently off-resonant with optical transitions of the other ions. (Since the order of inhomogeneous broadening of an excited state is 10 GHz, and the order of a frequency difference between ground states is 10 MHz, the width of distribution of $|2\rangle$-$|4\rangle$ transition frequencies can be set to a value that is N times higher than transition frequencies between the ground states, if the number N of ions used is less than 1000.) This being so, individual ions can be operated, using light beams that resonate with transitions between $|0\rangle$-$|4\rangle$, $|1\rangle$-$|4\rangle$ and $|3\rangle$-$|4\rangle$.

Referring to FIGS. 3 and 4, a description will now be given of the procedure of the first method that uses the Duan et al. method. The two ions on which a controlled phase-flip gate is operated will be referred to as "ion 1 and ion 2."

Firstly, the states of ions 1 and 2 are shifted from $|0\rangle$ to $|3\rangle$ (step S401). To shift $|0\rangle$ to $|3\rangle$, light beams that resonate with transitions between $|0\rangle$-$|4\rangle$ and between $|3\rangle$-$|4\rangle$ are applied through a side of the resonator, and Lambda-type STIRAP is executed to shift $|0\rangle$ to $|3\rangle$. The time required for this shift is approx. 10 μs.

Subsequently, both the transmittance variable mirrors 831 and 832 are set to the transmittance of 100%, and a single-photon pulse is emitted from the single-photon generator 821 to the resonator (from the partial transmission mirror 891 side). As a result, a controlled phase-flip gate using $|3\rangle$ and $|1\rangle$ as quantum bits is operated (step S402). The time required for the controlled phase-flip gate is determined from the life duration of the resonator and/or the coupling constant of the resonator and each ion. Supposing that the coupling constant of the resonator and an ion is approx. 100 kHz and the decay rate of the resonator is approx. 10 kHz, the time required for the controlled phase-flip gate is approx. 1 ms.

After that, the states of ions 1 and 2 are returned from $|3\rangle$ to $|0\rangle$, again using Lambda-type STIRAP (step S403). This is the termination of the controlled phase-flip gate operated on the quantum bits of ions 1 and 2.

The time $T_2$ required for the above process is approx. 1 ms. At this time, a π pulse is applied to all ions to thereby flip the states $|0\rangle$ and $|1\rangle$ of the ions (the $1^{st}$ flip operation of bang-bang control; step S302). In the embodiment, the π pulse is a pulse of a vibrating magnetic field generated by the magnetic field generator 203, since spins of the ions are to be flipped. The time required for this flipping operation is approx. 10 μs.

Thereafter, no operations are executed during the time $T_2$=1 ms (step S303). Lastly, the states $|0\rangle$ and $|1\rangle$ of all ions are flipped using a π pulse (the $2^{nd}$ flip operation of bang-bang control; step S304). Since the time required for each flip operation is sufficiently short, and the interval between flip operations is shorter than 5 ms, bang-bang control is successfully executed, and decoherence of the ions other than ions 1 and 2 is suppressed during the control.

The method of reading quantum bits will be described.

To detect whether the final state of ion 1 is $|0\rangle$ or $|1\rangle$, light beams resonating with $|1\rangle$-$|4\rangle$ and $|3\rangle$-$|4\rangle$ transitions of ion 1 are applied through a side of the resonator to shift the state of ion 1 from $|1\rangle$ to $|3\rangle$. Subsequently, the transmittance variable mirrors 831 and 832 are set to transmittances of 50% and 100%, respectively, and a single-photon pulse is applied by the single-photon generator 821 to the resonator (through the partial transmission mirror 891 of the resonator). The position of the total reflection mirror 871 is preset so that 100% of the single-photon pulse will be guided to the photon detector 811 after the pulse resonates with the resonator and is reflected therefrom. The photon reflected from the resonator is detected by the photon detector 811. If the state of ion 1 is $|0\rangle$, the photon resonates with the resonator and is guided by 100% to the photon detector 811, where it is detected. In contrast, if the state of ion 1 is $|2\rangle$, the photon does not resonate with the resonator because of vacuum Rabi splitting, and is returned by 100% toward the single-photon generator 821 since the phase of the photon is shifted by 180° with respect to that of the photon assumed when it resonates with the resonator. As a result, the photon is not detected by the photon detector 811. Thus, it is known that if the photon is detected, the final state of ion 1 is |0>, whereas if the photon is not detected, the final state of ion 1 is |1>.

Second Example

Referring to FIG. 8, a description will be given of a second example of the first method in which the method of Goto et al. is used.

In the second example, $Pr^{3+}$ ions doped in $Y_2SiO_5$ crystal are used as the above-mentioned physical systems (atoms or ions). To extend the coherence time, a magnetic field of an appropriate direction and magnitude is applied to the sample (see E. Fraval, M. J. Sellars, and J. J. Longdell, Phys. Rev. Lett. 95, 030506 (2005)). When the magnetic field generator 861 applies a magnetic field to the $Pr^{3+}$ ions in $Pr^{3+}$:$Y_2SiO_5$, the ground state of each ion is split into six hyperfine levels as shown in FIG. 11. The above-mentioned energy states |0>, |1>, |3> and |5> are assigned to four of the six hyperfine levels. Further, the above-mentioned energy state |2> is assigned to one of the excited states $^1D_2$ of each ion, and the above-mentioned energy state |4> is assigned to one of the excited states $^3P_0$ of each ion. An optical resonator is formed by mirror processing the surface of the crystal. The total reflection mirror 872 and partial transmission mirror 891 are used as the opposite mirrors of the optical resonator, thereby providing a single-sided resonator. Those $Pr^{3+}$ ions, whose |2>-|3> transitions resonate with the resonator mode, are used, and the states |0> and |1> of each ion are used as quantum bits. The entire crystal is placed in the cryostat 893, and is kept at 4K, i.e., the temperature of liquid helium.

The dye lasers 801 and 802 having their frequencies stabilized are used as light sources, and the laser beams emitted therefrom are slit into beams by the beam splitters 841 to 844, and are subjected to the acousto-optic modulators where they have their frequencies and intensities appropriately adjusted. The dye laser 802 is used to prepare beams that resonate with transitions between |0>-|2>, between |1>-|2>, between |5>-|2> and between |5>-|2>, and the dye laser 801 is used to prepare beams that resonate with transitions between |0>-|4>, between |1>-|4>, between |3>-|4> and between |5>-|4>.

The initialization process and reading process are substantially the same as those in the first example, and therefore no description is given thereof.

Referring to FIGS. 3 and 5, a specific procedure of the first method using the method of Goto et al. will be described. The two ions on which a controlled phase-shift gate is operated will be referred to as "ion 1 and ion 2."

Firstly, the state of ion 1 is shifted from |1> to |5> and that of ion 2 is shifted from |1> to |3> (step S501). To shift the state |1> of ion 1 to |5>, light beams that resonate with transitions of ion 1 between |1>-|4> and between |3>-|4> are applied through a side of the resonator, and Lambda-type STIRAP is executed to thereby shift |1> to |5>. Similarly, to shift the state |1> of ion 2 to |3>, light beams that resonate with transitions of ion 2 between |1>-|4> and between |3>-|4> are applied through the above-mentioned side of the resonator, and Lambda-type STIRAP is executed to thereby shift |1> to |3>. The time required for each shift is approx. 10 μs.

Subsequently, light pulses that resonate with the |5> to |2> transitions of ions 1 and 2 are applied through the above-mentioned side of the resonator, thereby shifting the states |5> and |3> of ions 1 and 2 to |3> and |5>, respectively, via adiabatic passage utilizing the resonator (step S502). Supposing that the coupling constant of the resonator and an ion is approx. 100 kHz and the decay rate of the resonator is approx. 10 kHz, the time required for adiabatic passage is approx. 0.5 ms.

After that, the states |3> and |5> of ions 1 and 2 are returned to |5> and |3>, respectively, via adiabatic passage utilizing the resonator, using light pulses that resonate |5>-|2> transitions and differ in a relative phase θ from the above-mentioned light pulses (step S503).

After that, the states |5> and |3> of ions 1 and 2 are both returned to |1> via Lambda-type STIRAP (step S504). This is the termination of the controlled phase-shift gate in which the phases of the quantum bits of ions 1 and 2 are shifted by θ. The time $T_2$ for executing the above-described controlled phase-shift gate is approx. 1 ms. At this time, the states |0> and |1> of all ions are flipped using a π pulse (the $1^{st}$ flip operation of bang-bang control). The time required for this flip operation is approx. 10 μs.

Thereafter, no operations are executed during the time $T_2$=1 ms (step S303). Lastly, the states |0> and |1> of all ions are flipped using a π pulse (the $2^{nd}$ flip operation of bang-bang control; step S304). Since the time required for each flip operation is sufficiently short, and the interval between flip operations is shorter than 5 ms, bang-bang control is successfully executed, and decoherence of the ions other than ions 1 and 2 is suppressed during the control.

Third Example

Referring to FIG. 8, the second method of the embodiment will be described.

In the third example, $Pr^{3+}$ ions doped in $Y_2SiO_5$ crystal are used as the above-mentioned physical systems (atoms or ions). To extend the coherence time, a magnetic field of an appropriate direction and magnitude is applied to the sample (see E. Fraval, M. J. Sellars, and J. J. Longdell, Phys. Rev. Lett. 95, 030506 (2005)). When the magnetic field generator 861 applies a magnetic field to the $Pr^{3+}$ ions in $Pr^{3+}$:$Y_2SiO_5$, the ground state of each ion is split into six hyperfine levels as shown in FIG. 11. The above-mentioned energy states |0>, |1>, |3> and |5> are assigned to four of the six hyperfine levels. Further, the above-mentioned energy state |2> is assigned to one of the excited states $^1D_2$ of each ion, and the above-mentioned energy state |4> is assigned to one of the excited states $^3P_0$ of each ion. An optical resonator is formed by mirror processing the surface of the crystal. The total reflection mirror 872 and partial transmission mirror 891 are used as the opposite mirrors of the optical resonator, thereby providing a single-sided resonator. Those $Pr^{3+}$ ions, whose |2>-|3> transitions resonate with the resonator mode, are used, and the states |0> and |1> of each ion are used as quantum bits. The entire crystal is placed in the cryostat 893, and is kept at 4K, i.e., the temperature of liquid helium.

The dye lasers 801 and 802 having their frequencies stabilized are used as light sources, and the laser beams emitted therefrom are slit into beams by the beam splitters 841 to 844, and are subjected to the acousto-optic modulators where they have their frequencies and intensities appropriately adjusted. The dye laser 802 is used to prepare beams that resonate with transitions between |0>-|2>, between |1>-|2>, between |5>-|2> and between |5>-|2>, and the dye laser 801 is used to prepare beams that resonate with transitions between |0>-|4>, between |1>-|4>, between |3>-|4> and between |5>-|4>.

The initialization process and reading process are substantially the same as those in the first example, and therefore no description is given thereof.

Figure 6:
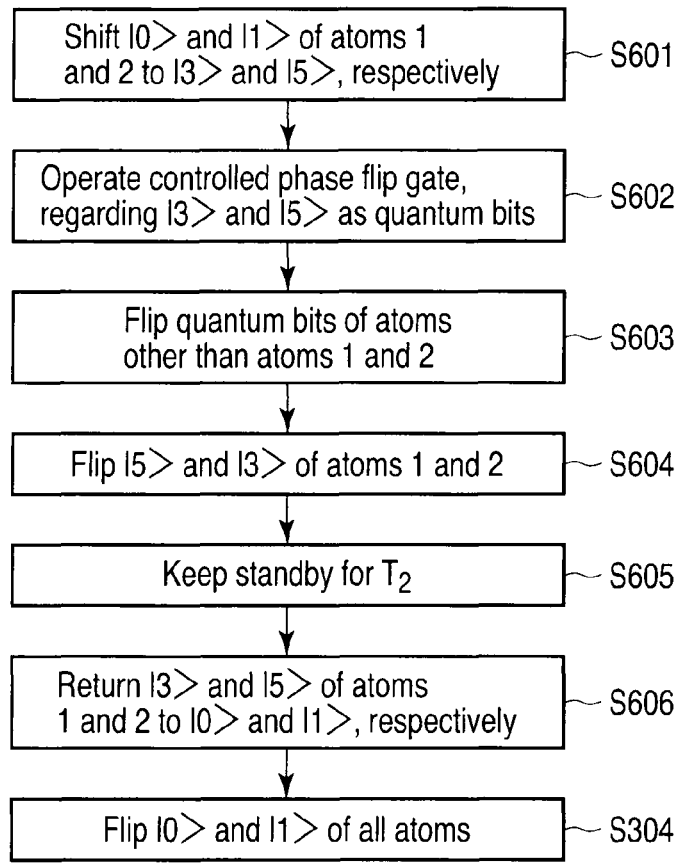
FIG. 6 is a flowchart illustrating an operation example performed when a second method is employed in the quantum computer of FIG. 2.

Referring to FIG. 6, a specific procedure of the second method will be described. The two ions on which a controlled phase-flip gate is operated will be referred to as "ion 1 and ion 2."

Firstly, the state of ion 1 is shifted from |0> to |3> and that of ion 2 is shifted from |1> to |5> (step S601). To shift |0> of to |3>, light beams that resonate with transitions between |0>-|4> and between |3>-|4> are applied through a side of the resonator, and Lambda-type STIRAP is executed to thereby shift |0> to |3>. Similarly, to shift |1> to |5>, light beams that resonate with transitions between |1>-|4> and between |5>-|4> are applied through the above-mentioned side of the resonator, and Lambda-type STIRAP is executed to thereby shift |0> to |3>. The time required for each shift is approx. 10 µs.

Subsequently, the transmittance variable mirrors 831 and 832 are both set to a transmittance of 100%, and a single-photon pulse is emitted from the single-photon generator 821 to the resonator (through the partial transmittance mirror 891 of the resonator). As a result, a controlled phase-flip gate using |3> and |5> as quantum bits is executed (step S602). The time required for the controlled phase-flip gate is determined from the life duration of the resonator and/or the coupling constant of the resonator and each ion. Supposing that the coupling constant of the resonator and an ion is approx. 100 kHz and the decay rate of the resonator is approx. 10 kHz, the time required for the controlled phase-flip gate is approx. 1 ms. Accordingly, the time required for the above-mentioned operations is $4T_1+T_2=1.04$ ms. At this time, the states |0> and |1> of the ions other than ions 1 and 2 are flipped using a π pulse (step S603), and then the states |3> and |5> of 1 and 2 are flipped using another π pulse (the $1^{st}$ flip operation of bang-bang control; step S604). The |0>-|1> transition frequency is approx. 8.6 MHz, and the |3>-|5> transition frequency is approx. 31 MHz. Accordingly, the initial flipping does not change the states of ions 1 and 2 because of great detuning. The subsequent flipping does not change the states of ions 1 and 2 because of great detuning, either. Further, to flip |3> and |5>, two light pulses may be used which are two-photon resonant with a |3>-|5> transition, but are little excited by |2> although they have frequencies close to a |3>-|2> transition frequency and also close to a |5>-|2> transition frequency, as is shown in FIG. 12.) The time required for each flip operation is approx. 10 µm.

Thereafter, no operations are executed during the time $T_2=1$ ms (step S605), and then the states |3> and |5> of ions 1 and 2 are returned to |0> and |1>, respectively, again using Lambda-type STIRAP (step S606). Lastly, the states |0> and |1> of all ions are flipped using a π pulse (the $2^{nd}$ flip operation of bang-bang control; step S304). As a result, decoherence of all ions is suppressed during $2(4T_1+T_2) \cong 2T_2 = 2$ ms.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A quantum bit computation method comprising:
preparing an optical resonator with a resonance frequency;
preparing a plurality of first physical systems contained in the optical resonator and including four energy states and two energy states, the four energy states being represented by |0>, |1>, |3> and |5>, the two energy states being represented by |2> and |4>, energies of |2> and |4> being higher than energies of |0>, |1>, |3> and |5>, a transition frequency between |3> and |2> being equal to the resonance frequency, |0> and |1> representing quantum bits;
shifting |0> of each of a first physical system and a second physical system, included in the first physical systems, to |3> by emitting thereto light pulses resonating with |0>-|4> transitions of the first physical system and the second physical system and |3>-|4> transitions of the first physical system and the second physical system;
shifting |1> of the first physical system and the second physical system to |5> by emitting thereto light pulses resonating with |1>-|4> transitions of the first physical system and the second physical system and |5>-|4> transitions of the first physical system and the second physical system;
emitting, to the optical resonator, a single-photon pulse with the resonance frequency;
flipping quantum bits of second physical systems except for the first physical system and the second physical system, the second physical systems being included in the first physical systems;
flipping |3> and |5> of each of the first physical system and the second physical system;
executing no operations by a time equal to a time for emitting the single-photon pulse to the optical resonator;
returning |3> of each of the first physical system and the second physical system to |0> by emitting thereto light pulses resonating with the |0>-|4> transitions and the |3>-|4> transitions;
returning |5> of the first physical system and the second physical system to |1> by light pulses resonating with the |1>-|4> transitions and the |5>-|4> transitions; and
flipping quantum bits of the first physical systems.

2. The method according to claim 1, wherein flipping |3> and |5> of each of the first physical system and the second physical system is executed by emitting thereto two light pulses which are two-photon resonant with |3>-|5> transitions of the first physical system and the second physical system.

3. A quantum computer comprising:
a single-sided resonator with a resonance frequency including a total reflection mirror and a partial transmission mirror;
a plurality of physical systems contained in the single-sided resonator and including four energy states and two energy states, the four energy states being represented by |0>, |1>, |3> and |5>, the two energy states being represented by |2> and |4>, energies of |2> and |4> being higher than energies of |0>, |1>, |3> and |5>, a transition frequency between |3> and |2> being equal to the resonance frequency, |0> and |1> representing quantum bits;
a light source configured to operate energy states of the physical systems;
a magnetic field generating unit configured to generate an oscillation magnetic field used for bit flipping; and
a control unit configured to operate a two-quantum-bit gate on quantum bits of a first physical system and a second physical system included in the physical systems, using the single-sided resonator, the light source, and first energy states of the first physical system and the second physical system which are other than |0> and |1>, second energy states of physical systems except for the first physical system and the second physical system do not change, the control unit being also configured to flip quantum bits of the physical systems using the magnetic field generating unit after operating the two-quantum-bit gate, to cause, after flipping the quantum bits, no operations to be executed by a time equal to a time for operating the two-quantum-bit gate, and to flip the quantum bits of the physical systems using the magnetic field generating unit after causing no operations to be executed, wherein the two-quantum-bit gate is realized by emitting, from the light source to the first physical system, two first light pulses resonating with a |1>-|4> transition of the first physical system and a |5>-|4> transition of the first physical system to shift |1> of the first physical system to |5>, emitting, from the light source to the second physical system, two second light pulses resonating with a |1>-|4> transition of the second physical system and a |3>-|4> transition of the second physical system to shift |1> of the second physical system to |3>, emitting, from the light source to the first physical system and second physical system, two third light pulses resonating with |5>-|2> transitions of the first physical system and the second physical system to execute adiabatic passage using the single-sided resonator, to shift |5> of the first physical system and |3> of the second physical system to |3> and |5>, respectively, emitting, from the light source to the first physical system and the second physical system, two fourth light pulses resonating with the |5>-|2> transitions to execute adiabatic passage using the single-sided resonator, to return |3> of the first physical system and |5> of the second physical system to |5> and |3>, respectively, emitting the two first light pulses from the light source to the first physical system to return |5> of the first physical system to |1>, and emitting the two second light pulses from the light source to the second physical system to return |3> of the second physical system to |1>.

4. The quantum computer according to claim 3, wherein the physical systems are rare-earth ions doped in crystal.

5. The quantum computer according to claim 4, wherein the energy states |3> and |4> are different electron excited states of the rare-earth ions.

6. A quantum computer comprising:
a single-sided resonator with a resonance frequency including a total reflection mirror and a partial transmission mirror;
a plurality of first physical systems contained in the single-sided resonator and including four energy states and two energy states, the four energy states being represented by |0>, |1>, |3> and |5>, the two energy states being represented by |2> and |4>, energies of |2> and |4> being higher than energies of |0>, |1>, |3> and |5>, a transition frequency between |3> and |2> being equal to the resonance frequency, |0> and |1> representing quantum bits;
a first light source configured to operate energy states of the first physical systems;
a second light source configured to generate a single-photon pulse having the resonance frequency;
a magnetic field generating unit configured to generate an oscillation magnetic field used for bit flipping; and
a control unit configured to cause the first light source to emit, to a first physical system and a second physical system included in the first physical systems, two first light pulses resonating with |0>-|4> transitions of the first physical system and the second physical system and |3>-|4> transitions of the first physical system and the second physical system to shift |0> of each of the first physical system and the second physical system to |3>, to cause the first light source to emit, to the first physical system and the second physical system, two second light pulses resonating with |1>-|4> transitions of the first physical system and the second physical system and |5>-|4> transitions of the first physical system and the second physical system to shift |1> of each of the first physical system and the second physical system to |5>, to cause the second light source to emit the single-photon pulse to the single-sided resonator to flip quantum bits of second physical systems except for the first physical system and the second physical system and flip |3> and |5> of each of the first physical system and the second physical system, then to cause no operations to be executed by a time equal to a time for emitting the single-photon pulse to the single-sided resonator, then to cause the first light source to emit, to the first physical system and the second physical system, two light pulses resonating with the |0>-|4> transitions and the |3>-|4> transitions to return |3> of each of the first physical system and the second physical system to |0>, to cause the first light source to emit, to the first physical system and the second physical system, two light pulses resonating with the |1>-|4> transitions and the |5>-|4> transitions to return |5> of each of the first physical system and the second physical system to |1>, and to cause the quantum bits of the first physical systems to be flipped.

7. The quantum computer according to claim 6, wherein the physical systems are rare-earth ions doped in crystal.

8. The quantum computer according to claim 7, wherein the energy states |3> and |4> are different electron excited states of the rare-earth ions.

* * * * *